Dec. 2, 1958  J. B. ZAPPONE ET AL  2,862,550
PREFABRICATED WINDOW
Filed Feb. 3, 1955  5 Sheets-Sheet 2

INVENTORS
John B. Zappone,
Charles F. Zappone &
Alexander H. Svetahor

Dec. 2, 1958  J. B. ZAPPONE ET AL  2,862,550
PREFABRICATED WINDOW

Filed Feb. 3, 1955  5 Sheets-Sheet 3

INVENTORS
John B. Zappone,
Charles F. Zappone &
Alexander H. Svetahor

Dec. 2, 1958 J. B. ZAPPONE ET AL 2,862,550
PREFABRICATED WINDOW
Filed Feb. 3, 1955 5 Sheets-Sheet 4

INVENTORS
John B. Zappone,
Charles F. Zappone &
Alexander H. Svetahor

INVENTORS
John B. Zappone,
Charles F. Zappone &
Alexander H. Svetahor

United States Patent Office 2,862,550
Patented Dec. 2, 1958

2,862,550

PREFABRICATED WINDOW

John B. Zappone, Latrobe, Charles F. Zappone, Greensburg, and Alexander H. Svetahor, Derry, Pa., assignors to Keystone Alloys Company, Derry, Pa., a corporation of Pennsylvania Application February 3, 1955, Serial No. 485,874

5 Claims. (Cl. 160—90)

This invention relates to a prefabricated window comprising a frame and readily removable sashes. More particularly, this invention pertains to a new permanent prefabricated window which is relatively simple to construct, adjust and install and which may readily serve as a storm window, for example, with sliding glazed and/or screened panels for ready access of light or of light and air.

In recent years there has been a tremendous increase in the manufacture and use of prefabricated windows employing, for example, extruded forms of a material like aluminum in their construction. Such windows in many cases, although made in a range of sizes, required so much in the way of alteration and refitting as to substantially constitute a custom-made window with the attendent increase in handling and cost. Further, unless such fitting was performed with precision, the entire window might be rendered valueless as in those cases where one of the members was trimmed to much. Prior such windows, in many cases, particularly when used as storm windows, lacked any convenient mode of moving or removing the sashes to permit air access or cleaning. In other situations, after moderate use, the various elements of the windows might bind. In times of temperate weather, where screen panels were to be used at all, an involved exchange substitution might be required. In some windows having sashes to be left permanently installed, either no locking means were provided or where they were provided, material increase in the depth of the window from front to back was caused thereby. Still further, many prior windows made no provision for storage in place of any panel that might not be used.

In our prefabricated window for which application Serial No. 309,162 for United States Letters Patent was filed on September 12, 1952, now Patent No. 2,728,117, the foregoing difficulties were overcome. The prefabricated window of this invention retains the advantages disclosed in our aforesaid application and constitutes a marked improvement thereupon in matters, among others, of frame, sash and latch mechanism construction. Particulars thereof including other objects and advantages of this invention will be apparent from the following description and from the accompanying drawings, which are illustrative only, in which.

Referring to the drawings, a new window 10 of this invention may, for example, be used as a storm window on the outer side of a regular window 11 set in a window opening in a masonry wall 12 of a building. The sides 13, sill 14 and lintel 15 with guide strips 16 comprise the surrounds of window 11. The outermost pair of guide strips 16 may be referred to as a blind stop.

For convenience, window 10 may be installed within the surrounds and against the blind stops, the distance between which with the clear height between the sill and lintel provide the width and height dimensions useful in selecting the size of window 10 to be installed on the outer side of window 11. Because of the new construction of this invention, such installation, as will appear, is a relatively simple matter.

Figures 3, 4, 5, 6, 7, 8:
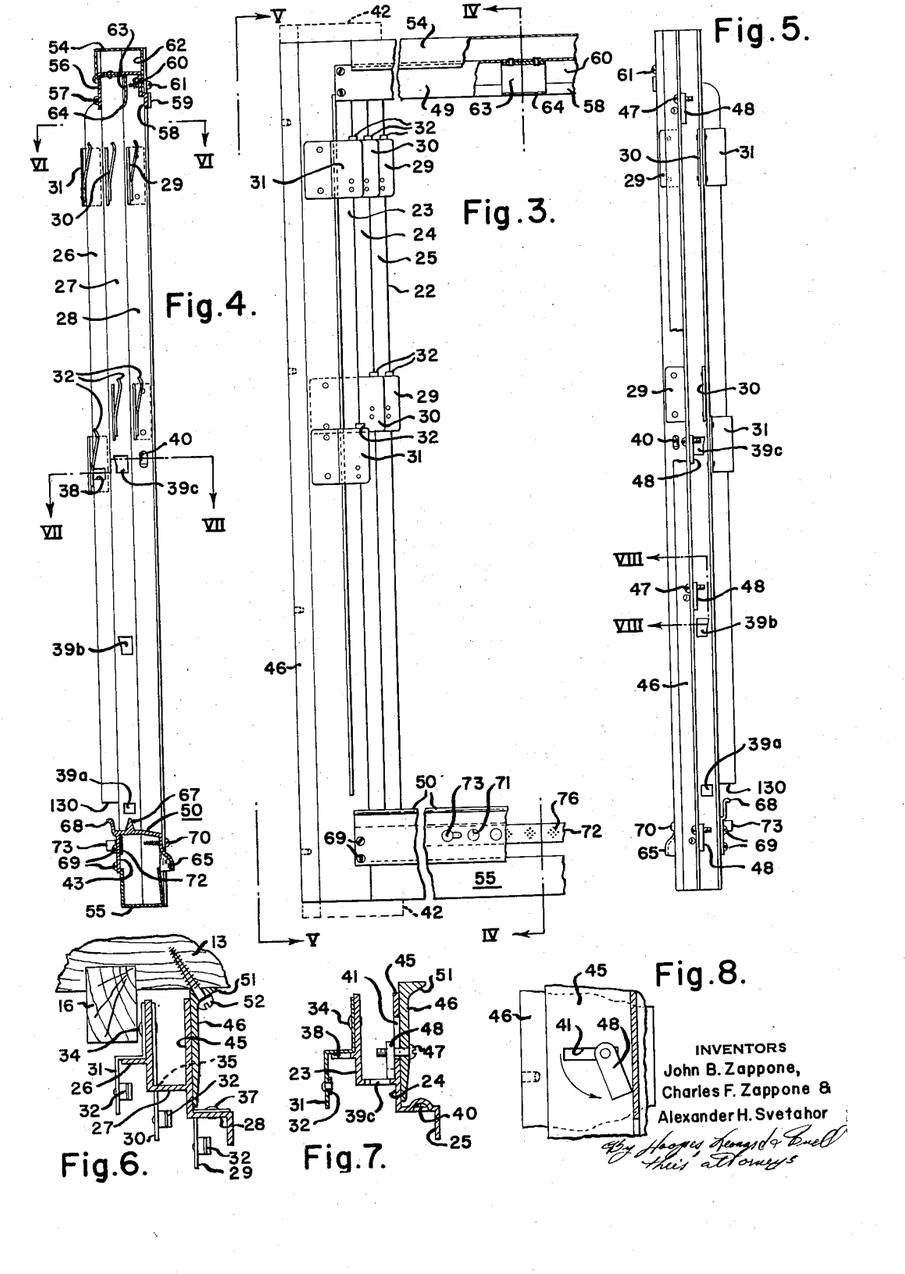
Figure 3 is a view of the left-hand side of the frame of our new window shown in Figure 1 with the sashes and panel removed and with parts broken away to more fully illustrate the new construction thereof.
Figure 4 is a view in section taken along line IV—IV of Figure 3.
Figure 5 is a side view in elevation looking in the direction of line V—V of Figure 3.
Figure 6 is a detailed view taken long line VI—VI of Figure 4.
Figure 7 is a further detailed view in section taken along line VII—VII of Figure 4.
Figure 8 is a view in elevation looking in the direction of line VIII—VIII of Figure 5.

New window 10 comprises an adjustable frame 17, one embodiment of which is shown in Figure 3, preferably with an upper, outer glazed sash 18; a lower sash 19 which may be termed an inner glazed sash; and, if desired, an inside screen sash 20 with screening 21 instead of glass extending across the area surrounded by sash 20.

Frame 17 comprises the right-hand and left-hand jambs 22 which, as shown, are single extruded shapes of a substance like aluminum. The stepped character of each jamb provides three pairs of landings respectively numbered 23, 24 and 25 which serve as tracks for panels 20, 19 and 18, respectively. The respective pairs of tracks from the inside to the outside of window 10 have a lesser width or gauge so that the respective panels may be inserted from the inside or removed to the inside with facility. Side wall portions 26, 27 and 28 respectively cooperate in each of the jambs 22 with the track portions 23, 24 and 25 to give the respective panels 20, 19 and 18 firm guidance respectively on the outer sides thereof and on the vertical edges thereof for free sliding operation.

Figures 9, 10, 11, 12, 13, 14:
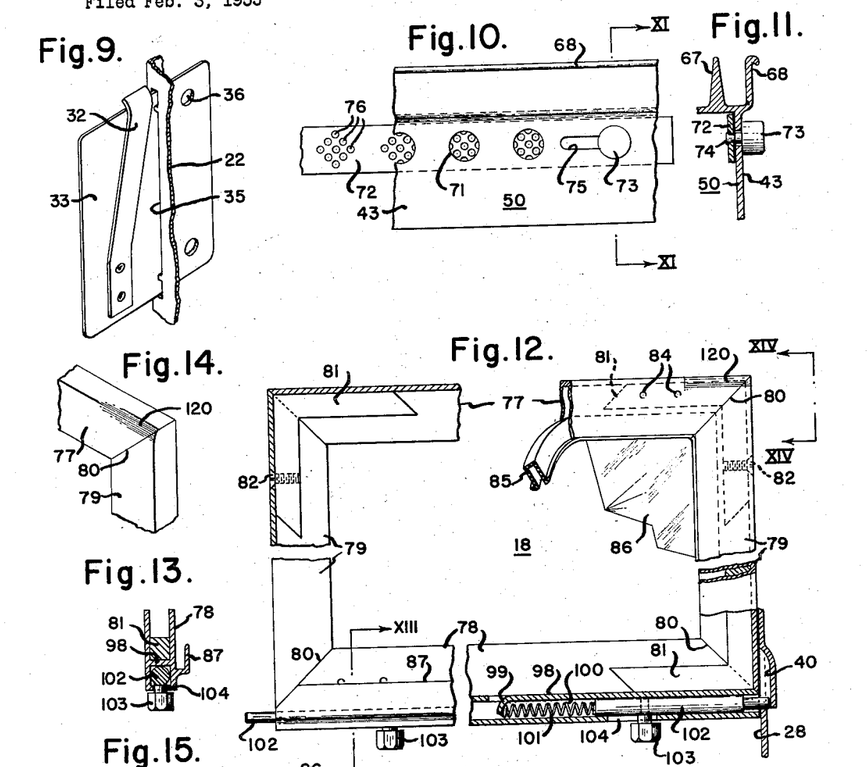
Figure 9 is a perspective view of a panel retainer generally looking in the direction of line IX—IX of Figure 6.
Figure 10 is a detailed view in inside elevation illustrating the ventilator construction in the embodiment of our new window shown in the drawings.
Figure 11 is a view taken along line XI—XI of Figure 10.
Figure 12 is a view in inside elevation, partly in section, of an upper glazed sash for the embodiment of our new window which is illustrated.
Figure 13 is a view taken along line XIII—XIII of Figure 12.
Figure 14 is a perspective view looking generally in the direction of line XIV—XIV of Figure 12.

Slidable retention of the respective panels 18, 19 and 20 against their respective tracks is insured by the respective upper and lower pairs of retainer members 29, 30 and 31. Each retainer may comprise a thin leaf spring 32 which may be made of stainless steel. Each spring 32 is securely mounted on a plate 33, which may be made of thin steel, countersunk rivets preferably being used as shown in Figure 9 to present a substantially smooth surface to any edge of a sash served by such spring. The thinness of each spring 32 is such that the edge of any sash served thereby will readily pass over the lower edge of such spring when such sash is raised so as to encounter such lower edge. The upper end of each spring 32 is slightly bent toward the inside of the new window for a similar purpose since in these new retainers, the upper end of each spring 32 is farther away from its respective mounting plate 33 than the lowermost end thereof where the spring is secured. The mounting plates 33 in turn are secured to the jambs 22. In the case of retainer members 31, as shown in Figures 3 to 6, the mounting plate is Z-shaped in plan so as to extend along the outside of wall 26 and thence outwardly along the flange of the jambs 22 at right angles to the side walls 26, rivets 34 serving to fasten those mounting plates for tracks 23 in position. In the case of the mounting plates 33 in retainers 30 for tracks 24, the respective walls 27 are provided with slotted openings 35, as illustrated in Figure 9, through which the mounting plates can extend for riveting to the outer parts of the jambs 22 by rivets passing through the holes 36 in the mounting plates. As shown in Figure 6, a similar slot in wall 28 is provided for the retainers 29 so that the outer side of the mounting plates 33 thereof can be bent along the outside of wall 28 and riveted by rivets 37, the inner ends of the rivets being countersunk to keep the track side of the walls 28 substantially flush.

Thereby, each of the springs 32 in each of the sets of retainer members 29 to 31 are held in opposed spaced relation to the sliding face of the respective tracks 25, 24 and 23. In addition, there is sufficient space and flexing movement possible so that the thickness of each sash will fit in slidable relation to its respective pair of tracks with sufficient firmness caused by the temper of the springs 32 to avoid any rattling even when there is a severe storm. At the same time, such new retainer members enable the side rails or stiles of the sashes to be U-shaped in cross section with the web outermost greatly simplifying fabrication and operation.

The pairs of side walls 26, 27 and 28 are also provided with bolt holes 38, 39 and 40 respectively. In each pair of side walls, the holes are at the same heights respectively and cooperate with the sash latch mechanisms on the respective panels to hold the sashes securely at whatever height an operator may desire. Aside from the retainer members, latch mechanisms and bolt holes, no provision is required for securing any of the sashes above the bottom of frame 17 in any normal operation of our new window 10.

Figure 2:
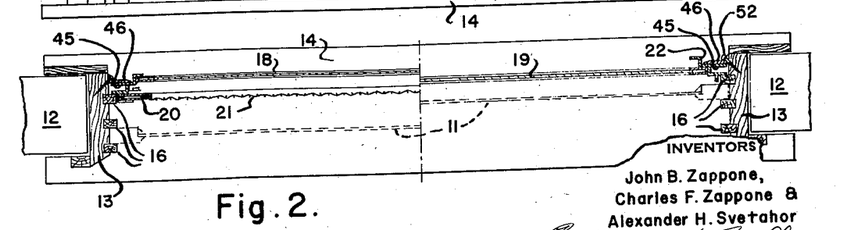
Figure 2 is a view in section taken along line II—II of Figure 1 and illustrating such window installed as a storm window within the surrounds of a window casing in a building having a conventional sash or prime window therein.

The jambs 22 are also provided with an integral flange 45 of left-hand and right-hand nature as shown in Figure 2 to which a laterally adjustable closure strip 46 is connected. The closure strips may be made straight and of sufficient strength without any groove by the extrusion of a material like aluminum. A plurality of adjustment screws 47 extend through holes down the height of the strips 46, through horizontal slots 41 in the flanges 45 and engage an elongated nut 48. The length of nut 48 to at least one side of the axis of the adjustment screws 47 is such that when screws 47 are turned after the strips 46 have been moved to intallation position, the nuts 48 will strike the outside of vertical wall 27 holding them against movement during the remainder of the tightening movement of the screws 47. Conversely, the screws 47 may be loosened if required because the nuts 48 will swing around until they again strike jamb 22 then to be held relative to further turning of the screws 47.

In installing a window 10 or a frame 17, as the case may be, the distance between the side walls 26 on the respective jambs and between a top edge of a top crossbar 49 and a bottom edge of a bottom crossbar 50 will readily provide the minimum width and height dimensions which a window opening must have in which a new window 10 is to be installed. In the construction of window 10, the jambs 22 are provided of extra length at the respective ends as shown by the dotted portions 42 in Figure 3 and are cut off in place to the height dimension between the sash and lintel in the window surrounds of the window opening in which the new window 10 is to be installed. This trimming constitutes a simple snipping or sawing operation and is the only material cutting operation required in the installation procedure. Generally, an outer flange of each jamb 22 will either abut against the blind stop 16 or will fit between the blind stops which is the situation shown in Figures 2 and 6. Then, the adjustable closure 46 may be moved laterally outwardly until flange 51 thereof seats itself against vertical sides 13 of the surrounds of window 11. At that point wood screws 52 may be inserted through the openings 53 in flange 51 and screwed into the surrounds 13. The tightening of screws 47 will bind the balance of frame 17 to the closure strips 46 and in place outside of window 11 in the embodiment shown.

Figure 1:
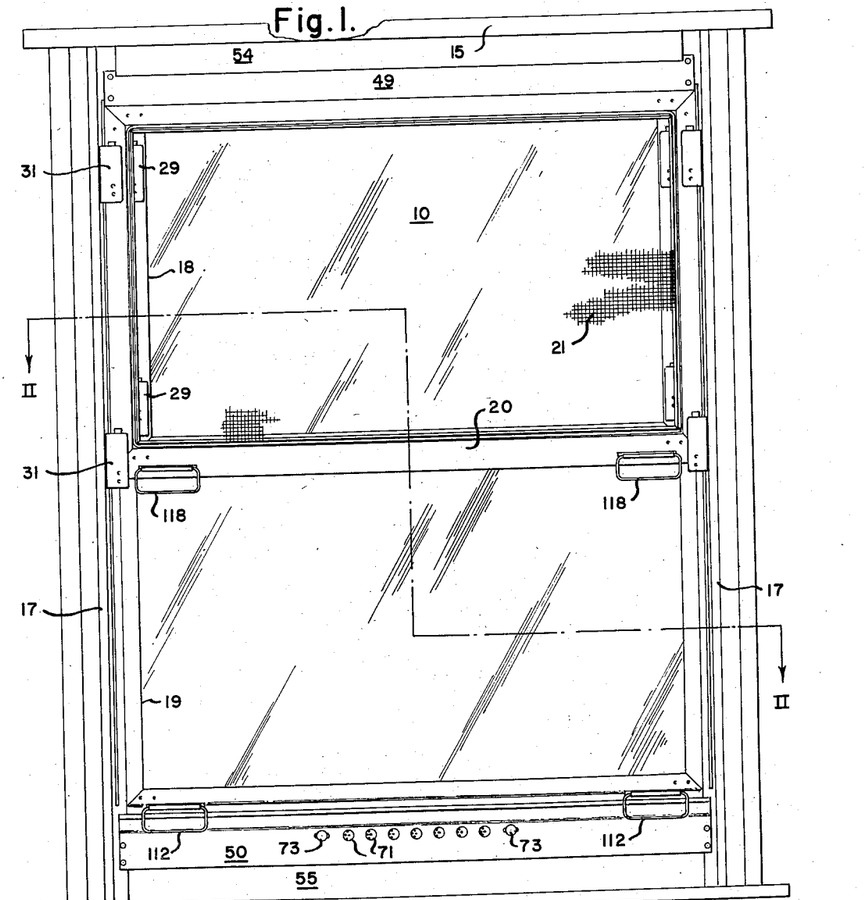
Figure 1 is a view in elevation from the inside of a new window of this invention with glazed sashes in closed window position and a screen panel in upper or storage position.

Any gap between lintel 15 and the top edge of crossbar 49 may be closed by sliding an inverted U-shaped top channel 54, which fits over the vertical sides of crossbar 49 as shown in Figures 3 and 4, upwardly until it rests against lintel 15 as shown in Figure 1 at which point the top of channel 54 will be on a level with the top of the jambs 22. The ends of channel 54 are cut to conform to the vertical configuration on the inside of the respective jambs 22 so that channel 54 may slide vertically relative thereto irrespective of the amount of the top of the jambs 22 that may be trimmed off in installing them as described above. Similarly, any gap between the bottom edge of bottom crossbar 50 and sill 14 may be closed by moving a bottom U-shaped channel 55 downwardly until the bottom thereof meets sill 14. The vertical sides of channel 55 slidably fit within the vertical sides of crossbar 50 and the ends of crossbar 50 and channel 55 conform as in the case of crossbar 49 and channel 54 to the configuration of inner sides of the jambs 22 along which they are to fit, channels 54 and 55 being free to slide in completing the installation of a window 10. The channels 54 and 55 may be made up of extruded channel sections or bent into channel shape from sheet material like aluminum sheets, fabrication of the ends thereof being accomplished by snipping or other means to length and configuration in the factory.

Top crossbar 49 may be an extruded member of structural strength and of generally inverted U-shape with the inner vertical side having ends 56 extending far enough to overlie the respective landings 23 so that crossbar 49 can be attached to the jambs 22 by metal screws 57. The lower edge 58 on the outer vertical side of crossbar 49 may be pressed in a manner so that the surface thereof lies relatively flush with the outer side of landings 25, an ear 59 at the respective ends 58 overlying the outer sides of the landings 25. The upper part 60 of the outer vertical side of crossbar 49 extends across the width of frame 17 up to the side walls 28 placing the landings 25 between the ears 59 and portion 60. Portion 60 is connected to the landings 25 by metal screws 61 above the slide path of sash 18, sufficient distance remaining between the inside of landings 25 and the outside of portion 60 for guiding movement of the outer vertical side 62 of channel 54. The configuration of the ends of crossbar 49 on the horizontal top surface thereof is like the configurations at the ends of the horizontal surface of channel 54. A depending presser member 63 may be fastened to the upper surface of crossbar 49. The lower edge 64 of presser 63 preferably is turned toward the inside of the window away from the landings 25 so as not to interfere with the uppermost positioning of panel 18. In its uppermost position the top rail of panel 18 will be pressed between presser 63 and edge 58 of crossbar 49 to assist in keeping the new construction substantially weather tight. Moreover, when the inner sash 19 is raised to its top position, edge 64 is in juxtaposition to the hook portion of sash 19 and serves as an anti-rattling means.

In the case of bottom crossbar 50, it too may be an extruded section of structural strength made of a material like aluminum. After such extrusion, the lower outer edge thereof may be bent out at spaced intervals to create cowls 65. Across the top surface 66 of crossbar 50, an integral weather ridge 67 is formed so as to cooperate with a bottom edge of panel 19 in making the new window substantially weather tight when panel 19 is in its fully down, closed position. Similarly, the portion of top surface 66 outside of ridge 67 slopes downwardly and outwardly. A seating strip 68 may also be integrally formed on crossbar 50 at the corner between the top surface 66 and the inside vertical surface thereof to coact when screen panel 20 is in its farthest down position by having strip 68 bear against panel 20 and insure against there being any rattling and also making the joint between strip 68 and the lower rail of panel 20 substantially weather tight.

The inner or inside vertical side 43 of crossbar 50 will extend far enough so as to overlie the landings 23 below the path of movement of panel 20, metal screws 69 being employed if desired to hold bar 50 to the jambs 22. The outer vertical side of crossbar 50 may extend substantially up to the side walls 28 and the landings 25 so that metal screws 70 may be used to fasten that side of crossbar 50 to the respective jambs. The inner plane surfaces of the inside and outside vertical sides of crossbar 50 are pressed against by U-shaped channel 55, which U-shaped channel may be formed from a sheet of material like aluminum for sliding contact with the inside of crossbar 50 as shown in Figures 3 and 4.

In the illustrated embodiment, the inside vertical side of crossbar 50 may be provided with a series of ventilation openings 71 behind which a slide 72 is adapted to be moved by knobs 73. Knobs 73 are connected to slide 72 by a rivet 74 which extends through each slot 75 through the inside vertical side 43 of crossbar 50. Slide 72 is provided with perforations 76 therein having the same spacing as the openings 71, there being sufficient space between the openings 76 so that when the knobs 73 are moved to the right-hand side of the slot 75 as shown in Figure 10, the ventilator openings 71 are open. Between the fully opened and fully closed position, knobs 73 may be set for partial opening of the holes 71. The knobs 73 are respectively connected to the respective ends of slide 72 by rivets 74 in the course of making the subassembly of bottom crossbar 50. By such riveting, the slide 72 is held firmly against the inside 43 so that to whatever position a knob 73 is moved in its slot 75, the slide 72 will remain in corresponding position until moved again without rattling and with complete assurance of protection against insects passing through the ventilator openings 71. In the illustrated embodiment, the knobs 73 are made as an integral part of the rivets 74 by a suitable upsetting operation, or otherwise, further simplifying the construction and fabrication of our new window. The openings beneath the cowl 65 extending outwardly of the outer vertical side of crossbar 50 provide ventilation openings on that side of the crossbar.

Glazed sash 18 comprises a top rail 77 of inverted U-shape, a bottom generally U-shaped meeting rail 78, and side U-shaped rails 79. These rails may be made by bending of a strip or by extrusion of a material such as aluminum. They are provided with mitered ends to form the corner joints 80. Thereby in respect of rails 77 and 79, continuous channel or U-shaped pieces may be formed or extruded and cut to length with a minimum of trouble and from a single piece of stock. Moreover, the side rails or stiles 79 have a planar side or web facing the side walls 27 with less likelihood of sticking or otherwise interfering with operation which might more readily happen with flanges or grooves along such outer sides of the sashes.

Angle bars 81 may be employed at each corner inside in the bight of the rails to join adjoining rails together. Thus, as shown in Figure 12, angle 81 there is fastened to rail 79 by a countersunk screw 82 and it may similarly be fastened to rail 77 by that means or by other means such as indenting the sides of rail 77 from the outside sufficiently as shown at 84 to pinch angle 81 and secure it in position that way. The other angles may be similarly fastened in constructing the sash 18. Sash 18 may be glazed by the use of a plastic bead 85 of U-shaped section surrounding the edge of the glass where such edges extend within and between the innermost edges of the respective rails in panel 18, the glass being designated by the numeral 86. The bottom or meeting rail 78 of panel 18 is provided on the outside of the inside side thereof with an integral hook 87 extending across the width of rail 78 to provide, as will be described, substantial weatherproofing at that location when the window 10 is fully closed as shown in Figure 22.

Figure 22:
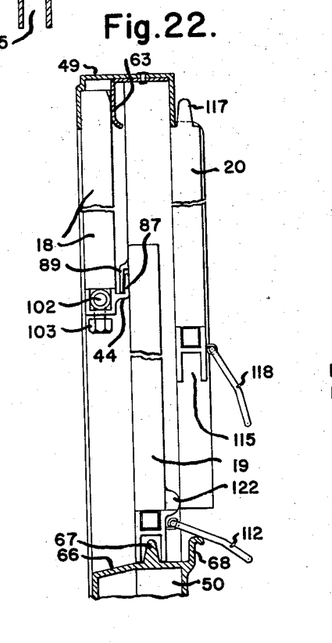
Figure 22 is an assembly view in side elevation with the frame in section to show our new window with the glazed sashes in closed position and the screen raised.

Lower, inner glass panel 19 is similar to panel 18 except that the outer side of top rail 88 of panel 18 is provided with a downwardly extending integral hook portion 89 to coact with hook 87 as shown in Figure 22 for weatherproofing. In addition, a bottom rail 90 in panel 19 is provided with a lower web 92 and an internal web 105. Since panel 19 is H-shaped in section, there is thereby provided, extending downwardly from web 92, a channel 91 to accommodate ridge 67 between the sides of channel 91 for weatherproofing purposes. Moreover, the various interengaging members which provide substantial weatherproofing in the new window also act to eliminate any rattling of the various relatively movable elements of the new window.

Figure 26:
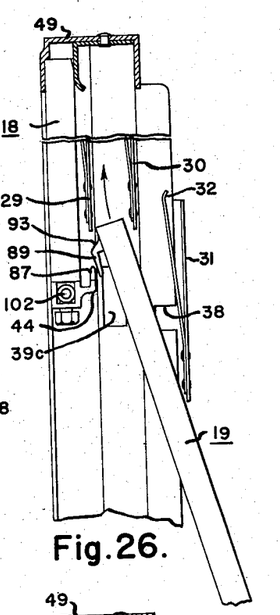
Figure 26 is a partial view in side elevation showing the outer or upper glazed sash in place and the lower or inner glazed sash being brought into engagement relation.
Figure 28:
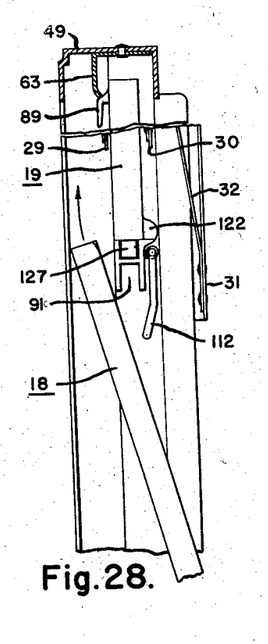
Figure 28 is a partial view illustrating an outer glazed sash being inserted into engagement relation in our new window while the inner glazed sash is up.
Figure 29:
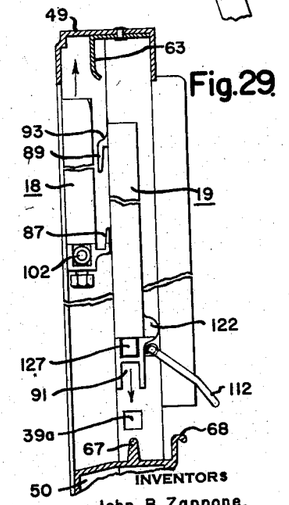
Figure 29 illustrates the movement of the glazed sashes following the insertion shown in Figure 28 which will close our new window and make it storm tight.

As shown in the figures, the panels 18 and 19 may readily be inserted in their respective trackways and as readily removed therefrom, the operation being substantially a reversal of steps. The hook portions 87 and 89 not only interengage when the new window 10 is closed but they are, moreover, of sufficient shortness in height such that when taken with the new retainer members and their positioning in our new window, an operator is enabled to place either glass sash in frame 17 when the other sash is at the top of its track, without moving that other sash. Moreover, the face 44 of hook 87 and face 93 of hook 89 are formed in inclined fashion to facilitate the sliding of the respective hooked portions past one another when moving a glazed sash 19 into engagement position in frame 17 as illustrated in Figure 26. For example, in inserting panel 18 the upper rail 77 is moved toward the tracks 25 immediately below the lower pair of retainers 29 and at an angle as shown in Figure 28. Panel 18 is moved upwardly against trackway 25 and the springs 32 of the lowermost pair 29 press against the inner faces of rails 79 facing the inside of window 10. The corners which those inner faces make with the top horizontal web of rail 77 are preferably rounded, as shown at 120 in Figures 12 and 14, to facilitate sliding thereof relative to the springs 32 in the retainers 29. The lower end of panel 18 is moved outwardly until the plane of sash 18 coincides with the plane of the tracks 25, the thickness of sash 18 generally corresponding to the depth of the side walls 28. As panel 18 is moved upwardly on tracks 25, the upper pair of springs 32 will also engage those inner faces of rails 79 and top rail 77 will engage presser 63. Irrespective of whether or not there is such a presser, one or more pairs of such retainers 29 may be made of sufficient strength to hold panel 18 in whatever position it may be moved along the tracks 25.

Figure 25:
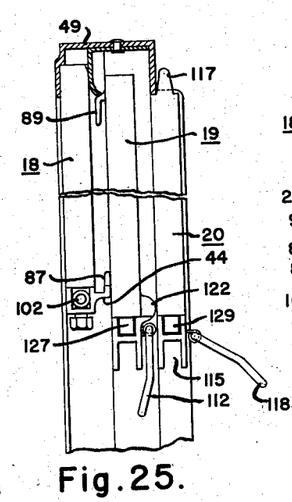
Figure 25 is a partial view similar to the view shown in Figure 24 with the screen raised so that the lower half of our new window is entirely open.
Figure 27:
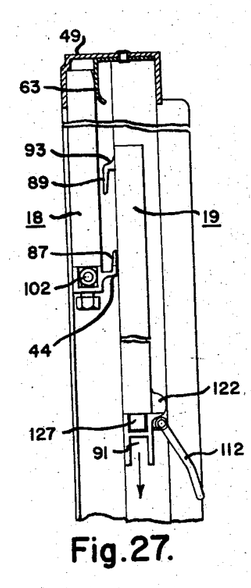
Figure 27 is a view similar to the view shown in Figure 26 with the two glazed sashes on their respective tracks and the inner glazed sash being moved downwardly to close our new window.

As shown in Figure 26, inner glazed panel 19, the middle one of the three sashes, is similarly inserted and is removed from frame 17 by a reversal of the insertion action. Panel 19 operates on tracks 24 and when inserted or removed, panel 18 need not be shifted from the position shown in Figures 22 and 27 to disengage the respective hooks 87 and 89 at the respective meeting rails. Instead, in removing panel 19 when panel 18 is at the top of its tracks, the latch mechanism of panel 19 merely has to be operated to remove the latch bolt from any of the bolt holes 39 in which they may then be. If sash 19 is in its lowermost position (holes 39a), it needs only to be released from such bolt holes and lifted enough to disengage the hook portion 89 from hook portion 87 and enable channel 91 to swing clear inwardly away from ridge 67. Thereupon the lower part of sash 19 is moved toward the inside of window 10 until sash 19 is substantially in the position shown in Figure 26 whereupon it can be slid out from beneath the lower pair of its own retainers 30 and from beneath the innermost lower pair of retainers 31. Generally, the screen sash 20 will be removed before either of the glazed sashes is taken out or reinserted in frame 17 on their respective pair of tracks. However, such removal of the screen is not necessary if the screen is in its topmost position as shown in Figure 25 on its pair of tracks 23.

When sash 19 is moved into engagement with its tracks 24 during any reinsertion thereof, first the lower pair of springs 32 bear against the inner faces of side rails 94, the retainers 30 being sufficiently spaced from tracks 24 to enable such sash 19 to be slipped into place. When sash 19 is in its lowermost position, sash 18 will normally be in its uppermost position so that the interengagement of the hook portions 89 and 87 respectively will retain the top or meeting rail 88 of sash 19 from being displaced from the plane of the window although screen 20 and the lower screen retainer members 31 would also prevent any material such displacement movement of rail 88. When sash 19 is in its lowermost position, the bottom rail 90 is fixed in the plane of window 10 by the ridge 67. As soon as there is any movement upward of panel 19, its lower pair of springs 32 in the retainers 30 engage it along the inner faces of the rails 94. The various rails of sash 19 are similarly joined together as described in connection with the rails of panel 18, and, the rails 88 and 94 may be made in the manner respectively of rails 77 and 79 of sash 18 with due allowance for the narrower width of sash 18.

Both panels 18 and 19 are provided in their bottom rails with latch mechanisms which cooperate respectively with the holes 40 and 39 to provide positive engagement at the desired height for the respective sashes. As in the case of retainers 29, retainers 30 are sufficient to hold sash 19 against the tracks 24 for substantial weather tightness and anti-rattling purposes, and their springs 32 may be of such strength as to hold sash 19 in any upper position to which it may be moved.

Bottom rail 78 of panel 18 is provided with an internal web 98 paralleling the bottom web of the rail and extending between the sides thereof. By means of a punch or otherwise, web 98 may have a lug 99 turned downwardly toward the bottom of the rail to provide a bolt recess 100 at each end facing the respective side walls 28. In each bolt recess, a spring 101 is confined between lug 99 and a latch bolt 102 and tends to push latch bolt 102 toward the respective side wall to engage any bolt hole that may be opposite thereto. A handle 103 extends through a slot 104 in the bottom toward each end of rail 78 so that it can be screwed into the respective latch bolts 102. In this way, movement of the handles 103 toward each other will withdraw the bolts 102 from the holes 40 and permit panel 18 to be lowered for removal or other purpose.

Figures 15, 16, 17:
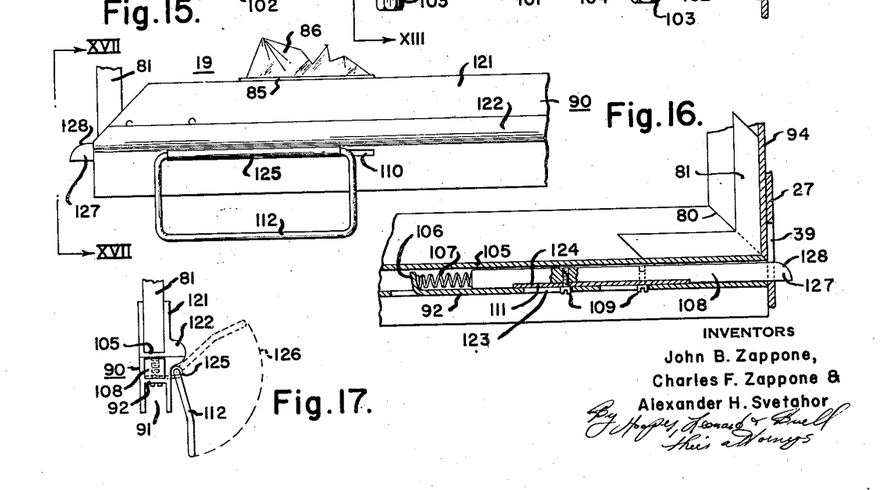
Figures 15 and 16 are views in inside elevation respectively of the opposite ends of the lower rail of an inner glazed sash for our new window in the embodiment illustrated.
Figure 17 is a view looking in the direction of line XVII—XVII of Figure 15.
Figures 18, 19, 20, 21:
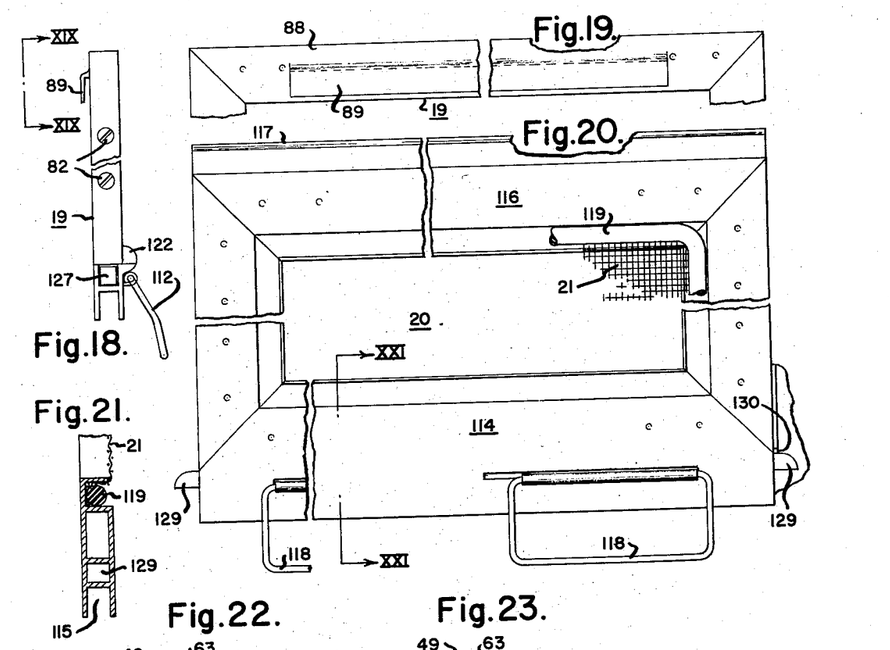
Figure 18 is a view in side elevation of an inner glazed sash suitable for our new window.
Figure 19 is a view inside elevation of a part of the sash structure shown in Figure 18 taken along line XIX—XIX of Figure 18.
Figure 20 is a view in inside elevation of a screen panel for our new window in the embodiment illustrated.
Figure 21 is a view taken along line XXI—XXI of Figure 20.

It will be noted that the handles 103 are beneath the underside of rail 78 thereby minimizing the thickness from front to back of the new structure occupied by the elements associated with panel 18. If desired, a further pair of holes 40 may also be provided for bolts 102 of panel 18 but such generally will be unnecessary in view of the intermediate height pair of bolt holes 39b for sash 19. Such bolt holes may either be cut out or punched out of the side walls, as in the case of bolt holes 38 and 39; or, as in the case of the pair of bolt holes 40, they may be formed by merely pressing the metal of the bolt hole outwardly as shown on the right-hand side of Figure 12. In like manner, in bottom rail 90 of panel 19, lower web 92 may be punched or otherwise indented to create a lug 106 against which the inner end of a spring 107 may press. The outer end of each spring 107 presses against a latch bolt 108 to urge it toward its respective side wall 27 and into one of the sets of holes 39. The new latch mechanism in rail 90 of sash 19 is illustrated in Figures 15 to 17. As shown, the inside face 121 of rail 90 is provided with an inwardly extending bead 122 and is slotted horizontally at 110 immediately below such bead. A slide extends into the latch bolt recess formed by the vertical sides of the rail 90 and by the webs 92 and 105 laterally outwardly of the lugs 106. Each slide 111 is fastened to a latch bolt 108 by screws 109 which connect the two together, the heads of the machine screws 109 being movable in slots 123 in web 92, there being sufficient clearance in the latch bolt recess for such assembly. The underside of the latch bolt 108 is undercut at 124 for engagement by such slide. The outer end to the inside of the slides 111 is formed in the shape of an eye 125 to which bent handles 112 are pivotally connected. Generally the eyes 125 engage the ends of the bail handles 112 sufficiently firmly so that the handles 112 will remain at whatever angle an operator may leave them unless engaged by movement as illustrated in one situation shown in Figure 23. The limit of angular movement of handles 112 is illustrated by an arm 126 in Figure 17. The vertical webs of the side rails 94 are pierced to permit the ends 127 of latch bolts 108 to extend therethrough, said ends having an upwardly curved face 128 for convenience of movement of the sash when an operator gripping the handles 112 moves each of them toward the center of the sash thereby moving slide 111 inwardly in slot 110 and withdrawing ends 127 into the recesses in the sash so that the sash can be moved, in the case of sash 19, to another set of bolt holes 39. Further, the fact that the webs of the side rails 94 are out at the extreme sides of the sashes gives greater firmness and strength to the latch mechanisms of our new window. The latch mechanism at each end of rail 90 is the same but of opposite hands. Again, the construction of the latch mechanism for panel 19 is such that the depth of panel 19 and hence the depth of side walls 27 are minimized reducing the over-all depth of the new window 10 and making it possible to apply it in places where there otherwise might not be room therefor.

Figure 24:
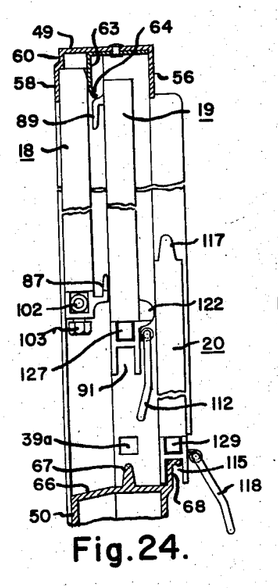
Figure 24 is an assembly view in side elevation with the frame in section to show our new window with both glazed sashes raised and the screen in lowered position to permit air to pass through our new window.

Screen panel 20 may also be made of extruded structural rails and joined together with mitered corners using angles substantially in the manner described for the glazed panels. Screening 21 may be applied between the inside of the rails in panel 20 and the edges thereof held by a plastic caulking strip 119 in an inwardly facing channel 113 integrally formed along the inside edge of each rail. The bottom edge of bottom rail 114 of sash 20 is provided with an upwardly extending inverted U-shaped recess 115 which when screen 20 is all the way down fits over member 68 in the manner described above. Top rail 116 of panel 20 is provided with an upwardly extending bead 117 which cooperates with the inner vertical side of top crossbar 49 as illustrated in Figure 25 when screen panel 20 is in its top position on tracks 23. The juxtaposition of bead 117 to that side of crossbar 49 makes our new window insectproof in a case, for example, where both glazed sashes are at the bottom of their tracks while the screen is at the top of its path of travel. Conversely, as illustrated in Figure 24, when both of the glazed sashes are about at the top of their tracks and the screen sash 20 is at the bottom of its sliding path, bead 122 acts to insectproof, as well as weatherproof, the space between sashes 19 and 20. The latch mechanism of panel 20 is constructed so as to be like the latch mechanism of sash 19, bent handles 118 serving to operate latch bolts 129, the outer ends of which in turn cooperate with bolt holes 38 when screen 20 is at the top of its path of travel and with the underside of lower edge 130 of the side walls 26 when screen 20 is at the bottom of its path of travel. By making such a provision for latching the screen either in its top or in its bottom position, the cooperation thereof with glazed sash 19 which can similarly be latched to cover the remainder of the window opening regardless of the position to which screen 20 is moved, assists in making our new window burglar-proof.

Retainers 31 are provided in pairs for screen sash 20, the lower pair being below the lower pairs of retainers 29 and 30. The insertion of panel 20 in frame 17 is readily made by raising screen 20 a distance sufficient to permit the lowermost edge of the channel 115 to clear the bead 68. The springs 32 of the retainers 31 press against the inner face of the side rails of sash 20 in the manner described in connection with that cooperation between the springs and the inner faces of the other sashes. To move sash 20 either from its lowermost position or its uppermost position, the handles 118 must be moved together toward the inner ends of the slots 131 corresponding to slots 110 in rail 90.

Figure 23:
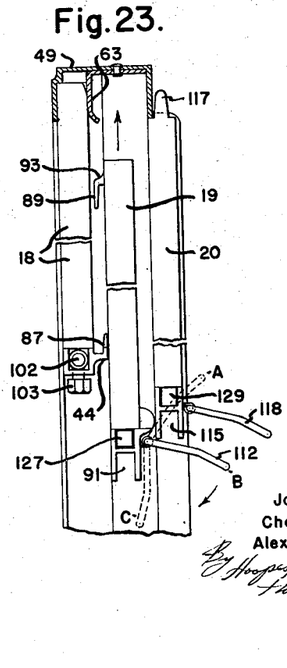
Figure 23 is a partial view similar to the view shown in Figure 22 and illustrating new features of our construction.

Our new construction when utilizing a screen panel 20 enables all of the sashes to be retained in frame 17 regardless of season so that, in the summertime, for example, the lower inner glass panel 19 can be stored at the top of frame 17 along the tracks 24 allowing the sash 20 and screen 21 to cover the lower half of window 10 for ventilation. Conversely, the screen panel 20 may be kept at the top of frame 17 and the glazed panels at the bottom if ventilation through the top of the new window 10 is desired instead. Of course, for ventilation through panel 20, both of the glazed sashes must be at the opposite end of their respective tracks in frame 17 from panel 20, as may be noted by looking at Figure 22. When the positions of those panels are reversed, handles 112 cannot be rendered inaccessible by swinging up against and into the plane of sash 19, because of bead 122. If screen 20 is slid past sash 19, as shown in Figure 23, it would engage the handles 112 if left in the position A and swing them through the position B to the position C. The bend in both of the handles 112 and 118 keeps them in flat relation relative to their respective sashes when they are down. When such handles are up, the bend keeps the outer side of the handles parallel to the respective rails sufficiently spaced from them to enable an operator to readily grip and move the handles since they cannot lie flat against the inside vertical face of the respective bottom rails.

As illustrated in Figures 22 to 29, in our new window, the respective sashes not only have relatively independent freedom of movement but in addition the glazed sashes particularly can either be inserted in the frame 17 or removed from the frame 17 without disturbance of the other glazed sash. Moreover, in the winter season when the screen panel 20 is not used, it can be moved to the top of its path, as shown in Figure 22, and there stored until such time as it is again desired to permit air to enter a building through such a window 10.

In some cases, it may be desirable to use a pair of the new windows of this invention in side-by-side relation as when providing a storm window for a particularly large prime window. Various changes in details may be made without departing from the spirit of the invention or the scope of the appended claims.

We claim:

1. In a prefabricated window, in combination, a frame having jambs and top and bottom crossbars defining a window opening, gap-closing channels adjustably connected to said crossbars and vertically movable relative thereto, a substantially planar closure strip adjustably connected to said jambs and horizontally movable relative thereto, said jambs being of opposite hands and having tracks and side walls on each thereof on the side of said window opening, said tracks being substantially in rectilinearly stepped arrangement along the inner sides of said jambs and said side walls having portions substantially normal to the plane of said window to complete said stepped arrangement in cross section, respective pairs of tracks on said jambs being in lateral registry, separate sashes to slide along said tracks, said sashes having side rail, said side rails having a configuration in section with a web thereof laterally outermost to present a generally smooth outer side, retainers having mounting plates secured to said jambs in adjacent and opposed relation to each of said pairs of tracks, said mounting plates being normal and adjacent to the innermost edge of said portions of said side walls respectively, springs projecting into the space between said mounting plates and said tracks respectively to bear against the inner faces of said sashes respectively, said retainers being generally positioned adjacent the top of said sashes when in lowermost position on their respective tracks and spaced such that any of said sashes may be independently removed from said frame bolt holes in said side walls, a latch mechanism in the bottom rails of said sashes respectively and having latch bolts normally urged to project laterally beyond the sides of said respective side rails, said latch bolts being adapted to engage said respective bolt holes, a bolt slide extending through the bottom rail on at least one of said sashes, said slide being connected to a latch bolt, a bent bail handle connected to said slide, a bead on the bottom rail of said last-mentioned sash positioned adjacent said handle to limit the angular swing of said handle, a top bead on at least one of said sashes to cooperate with said top crossbar when said last-mentioned sash is in raised position, interengaging hooks having complementarily inclined faces on the meeting rails of two adjoining ones of said sashes, said bottom crossbar having ventilator openings therethrough, a ventilator slide with spaced perforations therein positioned on one side of said openings, and a rivet knob extending through a vertical side of said bottom crossbar to engage said ventilator slide on the other side of said vertical side of said bottom crossbar to hold said slide against said bottom crossbar in operative relation to said openings.

2. In a prefabricated window, in combination, a frame having jambs and crossbars defining a window opening, said jambs being of opposite hands and having three pairs of tracks and side walls on each thereof on the side of said window opening, said tracks being substantially in rectilinearly stepped arrangement along the inner sides of said jambs and said side walls having portions substantially normal to the plane of said window to complete said stepped arrangement in cross section, respective pairs of tracks on said jambs being in lateral registry, a pair of separate glazed sashes and a screen sash to slide along said tracks respectively, said sashes having side rails, said side rails having a channel configuration in section with a web of said channels laterally outermost to present a generally smooth outer side, retainers having pairs of mounting plates secured to said jambs in adjacent and opposed relation to the upper portion of each of said pairs of tracks, said mounting plates being normal and adjacent to the innermost edge of said portions of said side walls respectively, the lower pair of said retainers for the inside pair of tracks being lowest to enable said glazed sashes to be moved independently into and out of engagement with their respective tracks, springs projecting into the space between said mounting plates and said tracks respectively to bear against the inner faces of said sashes respectively, said springs being connected at their lower ends to said mounting plates and extending generally upwardly and toward their respective tracks, said retainers being generally positioned adjacent the top of said sashes when in lowermost position on their respective tracks and spaced such that any of said sashes may be independently removed from said frame, latch means in the bottom rails of said sashes respectively, said latch means having a guide passage for latch bolts normally urged to project laterally beyond the sides of said respective side rails, said latch bolts being adapted to engage said respective jambs, a bolt slide extending through the inside of the bottom rail on at least the inner glazed one of said sashes, said slide being connected to a latch bolt having an upwardly curved face, a bent handle connected to said slide, a bead along the bottom rail of said last-mentioned sash extending substantially to the plane of the adjoining face of an adjoining sash, and interengaging hooks on the meeting rails of said pair of glazed sashes.

3. In a prefabricated window, in combination, a frame having jambs and cross bars defining a window opening, said jambs being of opposite hands and having tracks and side walls on each thereof on the side of said window opening, said tracks being substantially in rectilinearly stepped arrangement along the inner sides of said jambs and said side walls having portions substantially normal to the plane of said window to complete said stepped arrangement in cross section narrowing toward the outside of said window, respective pairs of tracks on said jambs being in lateral registry, separate removable sashes to slide along said tracks, said sashes having side rails, said side rails having a face in juxtaposition to said side walls to present a generally smooth outer side adjacent to said side walls, rigid retainers secured to said jambs in adjacent and opposed relation to each of said pairs of tracks, said retainers having springs projecting toward said tracks respectively to bear against the inner faces of said sashes respectively, said retainers being generally positioned adjacent the top of said sashes when in lowermost position on their respective tracks and spaced such that any of said sashes may be independently removed from said frame latch mechanism in said sashes, the inner of said sashes having a latch bolt passage in the bottom rail, said passage extending through the plane of said face of said side rails, a lug formed in a web of said bottom rail, a latch bolt in said passage laterally outwardly of said lug, a spring between said lug and bolt to urge said bolt laterally outwardly, said latch bolt being adapted to engage means to hold its respective sash at a preselected height, a bolt slide extending through said bottom rail to engage said latch bolt in a positive manner, a bail handle connected to said slide having its sides bent, interengaging hooks having inclined faces on the meeting rails of said sashes, and bead means to make said window substantially weather and insect-proof.

4. In a prefabricated window, in combination, a frame having jambs and top and botom crossbars defining a window opening, said jambs being of opposite hands and having tracks and side walls on each thereof on the side of said window opening, said tracks being substantially in rectilinearly stepped arrangement along the inner sides of said jambs and said side walls having portions substantially normal to the plane of said window to complete said stepped arrangement in cross section, respective pairs of tracks on said jambs being in lateral registry, separate sashes to slide along said tracks, said sashes having side rails, said side rails having a channel configuration in section with a web of said channels laterally outermost to present a generally smooth outer side, and retainers having mounting plates secured to said jambs in adjacent and opposed relation to each of said pairs of tracks, said mounting plates being normal and adjacent to the innermost edge of said portions of said side walls respectively, springs projecting into the space between said mounting plates and said tracks respectively to bear against the inner faces of said sashes respectively, said retainers being generally positioned adjacent the top of said sashes when in lowermost position on their respective tracks and spaced such that any of said sashes may be independently removed from said frame.

5. In a prefabricated window, in combination, a frame having jambs and top and bottom crossbars defining a window opening, said jambs being of opposite hands and having tracks and side walls on each thereof on the side of said window opening, said tracks having portions substantially in rectilinearly stepped arrangement along the inner sides of said jambs and said side walls being substantially normal to the plane of said window to complete said stepped arrangement in cross section, respective pairs of tracks on said jambs being in lateral registry, separate sashes to slide along said tracks, said sashes having side rails, said side rails having a channel configuration in section with a web of said channels laterally outermost to present a generally smooth outer side, retainers having mounting plates secured to said jambs in adjacent and opposed relation to each of said pairs of tracks, said mounting plates being normal and adjacent to the innermost edge of said portions of said side walls respectively, springs projecting into the space between said mounting plates and said tracks respectively to bear against the inner faces of said sashes respectively, said retainers being generally positioned adjacent the top of said sashes when in lowermost position on their respectively tracks and spaced such that any of said sashes may be independently removed from said frame, and bead means across at least one of said sashes extending substantially to the plane of an adjoining face of an adjoining sash to make weather and insect-proof provision for said window.

References Cited in the file of this patent

UNITED STATES PATENTS

| | | |
|---|---|---|
| 2,569,942 | Milnor | Oct. 2, 1951 |
| 2,583,851 | Kaufmann | Jan. 29, 1952 |
| 2,611,934 | Milone | Sept. 30, 1952 |
| 2,613,403 | Gardner | Oct. 14, 1952 |
| 2,626,658 | Milone | Jan. 27, 1953 |
| 2,630,891 | Zitomer | Mar. 10, 1953 |
| 2,728,117 | Zappone et al. | Dec. 27, 1955 |

UNITED STATES PATENT OFFICE
CERTIFICATE OF CORRECTION

Patent No. 2,862,550                                    December 2, 1958

John B. Zappone et al.

It is hereby certified that error appears in the printed specification of the above numbered patent requiring correction and that the said Letters Patent should read as corrected below.

Column 4, line 25, for "intallation" read -- installation --; column 8, line 75, for "arm" read -- arc --.

Signed and sealed this 14th day of July 1959.

L)
t:

H. AXLINE
ing Officer

ROBERT C. WATSON
Commissioner of Patents